United States Patent
Tsuruta et al.

(10) Patent No.: US 8,880,319 B2
(45) Date of Patent: Nov. 4, 2014

(54) DRIVING CONTROL APPARATUS MOUNTED ON VEHICLE TO AVOID COLLISION WITH PRECEDING VEHICLE

(71) Applicant: Denso Corporation, Kariya (JP)

(72) Inventors: Tomohiko Tsuruta, Aichi-ken (JP); Motonori Tominaga, Anjo (JP); Yusuke Ueda, Nishio (JP); Takeshi Hatoh, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/775,750

(22) Filed: Feb. 25, 2013

(65) Prior Publication Data

US 2013/0226432 A1  Aug. 29, 2013

(30) Foreign Application Priority Data

Feb. 29, 2012  (JP) ................. 2012-044211

(51) Int. Cl.
  *G08G 1/16*  (2006.01)
  *B60W 30/165*  (2012.01)
(52) U.S. Cl.
  CPC ............. *G08G 1/166* (2013.01); *B60W 30/165* (2013.01)
  USPC ............................................ 701/96; 701/70
(58) Field of Classification Search
  CPC ........... B60T 8/17558; B60T 2201/02; B60T 3301/022; B60T 7/22; B62D 15/0265; B62D 6/00; G08G 1/16; G08G 1/166; G08G 3/02; B60W 30/16; B60W 30/09; B60W 30/095; B60W 2550/308; B60W 2550/306; B60W 30/165; B60W 30/18163; B60W 30/12; B60K 31/0008; G01S 13/867; G06K 9/00805
  USPC ............ 701/76, 70, 41, 42, 301, 79, 93, 408, 701/412; 340/435, 436, 903; 180/170
  See application file for complete search history.

(56) References Cited

U.S. PATENT DOCUMENTS

| | | | |
|---|---|---|---|
| 7,171,296 B2* | 1/2007 | Kato et al. ...................... 701/70 |
| 2004/0022416 A1* | 2/2004 | Lemelson et al. ............ 382/104 |
| 2004/0193374 A1* | 9/2004 | Hac et al. ...................... 701/301 |
| 2005/0125131 A1* | 6/2005 | Kato et al. ...................... 701/70 |
| 2009/0192683 A1* | 7/2009 | Kondou et al. ................. 701/53 |

FOREIGN PATENT DOCUMENTS

| | | |
|---|---|---|
| JP | 2003-085698 | 3/2003 |
| JP | 2008-074210 | 4/2008 |

* cited by examiner

*Primary Examiner* — Marthe Marc-Coleman
(74) *Attorney, Agent, or Firm* — Harness, Dickey & Pierce, PLC

(57) ABSTRACT

A driving control apparatus mounted on a present vehicle used for tracking a preceding vehicle includes: control module for controlling the present vehicle to accelerate or decelerate; vehicle detecting module for detecting the preceding vehicle; region detecting module for detecting a lateral region existing on an adjacent lane being adjacent to a present lane where the present vehicle exists, the lateral region being laterally to the present vehicle; and region determining module for determining whether or not the lateral region is an avoidance region that has a predetermined area.
The control module performs an avoidance standby operation that allows the present vehicle to accelerate or decelerate based on a result of determining by the region determining module, when the vehicle detecting module detects the preceding vehicle existing on the present lane.

7 Claims, 8 Drawing Sheets

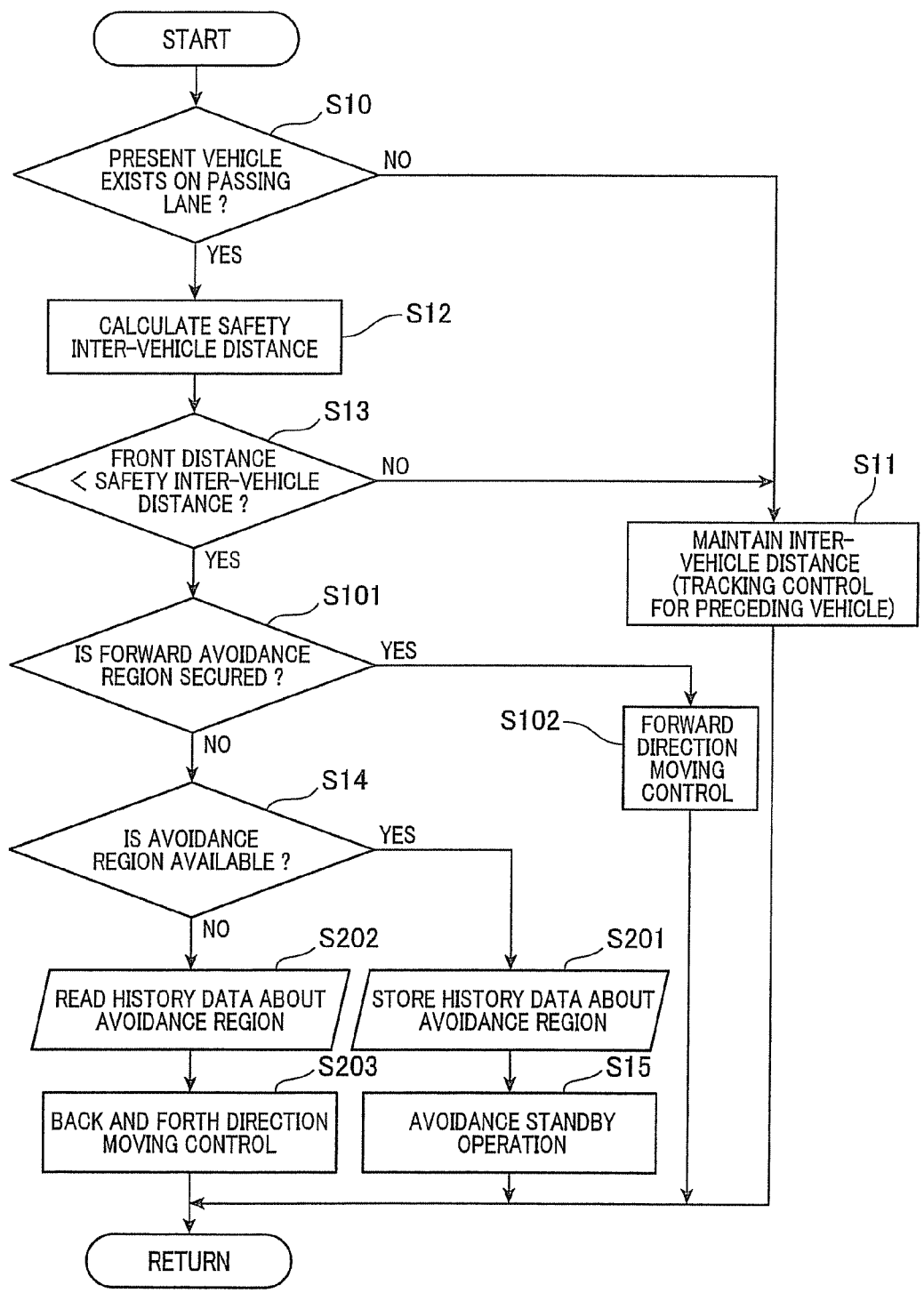

DRIVING CONTROL APPARATUS MOUNTED ON VEHICLE TO AVOID COLLISION WITH PRECEDING VEHICLE

CROSS REFERENCE TO RELATED APPLICATION

This application is based on and claims the benefit of priority from earlier Japanese Patent Application No. 2012-44211 filed on Feb. 29, 2012 the description of which is incorporated herein by reference.

BACKGROUND

1. Technical Field

The present disclosure relates to a driving control apparatus mounted on a vehicle.

2. Description of the Related Art

Conventionally, an automatic steering system for controlling a traveling of the vehicle and supporting driving of the vehicle is known. For example, according to the automatic steering system disclosed by a Japanese Patent Application Laid-Open publication No. 2003-085698, when an obstacle exists ahead of the vehicle, the automatic steering system detects the location of an obstacle in the adjacent traffic lane (e.g. other vehicle) and performs the automatic steering control or notifies the driver of the obstacle existing in the adjacent traffic lane.

Moreover, a Japanese Patent Application Laid-Open Publication No. 2008-074210 discloses a driving control apparatus in which the distance between the present vehicle and the preceding vehicle (i.e., inter-vehicle distance) is shortened so as to prevent the other vehicle cutting in front of the present vehicle, when a predetermined region is sufficiently secured in front of the present vehicle for avoiding collisions, based on the steering control.

However, in the on-vehicle driving control apparatus disclosed by the patent document No. 2003-085698, the region which is reserved for collision avoidance is recognized after an obstacle in front of the vehicle is detected. Therefore, since it is considered that a condition may arise in which an obstacle in front of the vehicle cannot be avoided, the present vehicle cannot reliably avoid obstacles in front of the present vehicle.

Further, according to the on-vehicle driving control apparatus disclosed by the above-described patent document No. 2008-074210, since the inter-vehicle distance is relatively short, when the preceding vehicle performs rapid braking, it is hard to move the present vehicle towards the region where collision is avoided by the steering control operation.

SUMMARY

The embodiment of the present disclosure provides an on-vehicle driving control apparatus capable of avoiding collision between the present vehicle and the preceding vehicle.

Specifically, the embodiment provides a driving control apparatus mounted on a present vehicle used for tracking drive operation in which the present vehicle is driven so as to track a preceding vehicle existing ahead of the present vehicle. The driving control apparatus includes: control means for controlling the present vehicle to accelerate or decelerate; vehicle detecting means for detecting the preceding vehicle; region detecting means for detecting a lateral region existing on an adjacent lane being adjacent to a present lane where the present vehicle exists, the lateral region being laterally adjacent to the present vehicle; and region determining means for determining whether or not the lateral region is an avoidance region that has a predetermined area. The control means is configured to perform an avoidance standby operation that allows the present vehicle to accelerate or decelerate based on a result of the determination by the region determining means, when the vehicle detecting means detects the preceding vehicle existing on the present lane.

In the above-described disclosure, the control means may preferably be configured to perform the avoidance standby operation when the region determining means determines that the lateral region detected by the region detecting means is the avoidance region. Moreover, the control means may preferably perform the avoidance standby operation such that the control means controls the present vehicle to accelerate or decelerate so as to maintain a position where the present vehicle is capable of entering the avoidance region.

According to the driving control apparatus of the present disclosure, when the preceding vehicle is detected on the present lane where the present vehicle is running, the avoidance standby operation in which the present vehicle is controlled to run at a position enabling the present vehicle to enter the avoidance region is executed. For example, the present vehicle is controlled to run at a position being adjacent to the avoidance region. As a result, even if the preceding vehicle rapidly decelerates, the present vehicle can change the running direction (traffic lane) to enter the avoidance region whereby a collision with the preceding vehicle can be avoided.

In the above-described disclosure, the apparatus is provided with distance determining means for determining whether or not a distance between the present vehicle and the preceding vehicle existing on the present lane is a safe inter-vehicle distance that is capable of preventing the present vehicle colliding with the preceding vehicle by a braking operation of the present vehicle. The control means may preferably be configured to prioritize an inter-vehicle distance maintaining control rather than the avoidance standby operation when the safe inter-vehicle distance is secured, the inter-vehicle distance maintaining control being performed such that acceleration or deceleration of the present vehicle is controlled so as to maintain the safe inter-vehicle distance. Moreover, the control means may preferably be configured to prioritize the avoidance standby operation rather than the inter-vehicle distance maintaining control when the safe inter-vehicle distance is not secured and the avoidance region is determined by the region determining means and also, the control means may preferably be configured to prioritize the inter-vehicle distance maintaining control when the safe inter-vehicle distance is not secured and the avoidance region is not determined by the region determining means.

According to this configuration, for example, when the present vehicle is running on the passing lane, without significant change in the travelling speed, the present vehicle can continue to run on the passing lane. In other word, when the safe inter-vehicle distance between the present vehicle and the preceding vehicle can be maintained, the driving control apparatus controls the present vehicle to continue to run and track the preceding vehicle while maintaining the safe inter-vehicle distance. In this case, when the driving control apparatus detects the avoidance region on an adjacent slow lane, the avoidance standby operation is not performed. That is to say, a passing drive (driving on the passing lane) is not stopped by decelerating the travelling speed of the present vehicle.

Moreover, when the safe inter-vehicle distance is not secured and the avoidance region exists, the driving control apparatus performs the avoidance standby operation in advance to avoid the preceding vehicle if necessary. In this case, even when the present vehicle is running on the passing lane, the present vehicle is controlled to be decelerated. Further, when the safe inter-vehicle distance is not secured and the avoidance region does not exist, the driving control apparatus executes the inter-vehicle distance maintaining control in which the present vehicle is controlled to be further decelerated so as to extend the distance between the present vehicle and the preceding vehicle to be the safe inter-vehicle distance.

In the above-described disclosure, the driving control apparatus is provided with forward region determining means for determining whether or not a forward avoidance region having a predetermined area exists and the preceding vehicle running on the present lane exists ahead of the forward avoidance region, the forward avoidance region being located in front of a preceding vehicle on the adjacent lane that is ahead of the lateral region. The control means may preferably be configured to control the present vehicle to move further forward on the present lane when the forward region determining means determines that the forward avoidance region exists and the preceding vehicle running on the present lane exists ahead of the forward avoidance region.

As a result, the present vehicle is able to run at a position adjacent to the forward avoidance region so that the preceding vehicle running on the present lane can readily be avoided. In other words, even when the avoidance region does not exist laterally to the present vehicle, if the preceding vehicle on the present lane exists ahead of the forward avoidance region, by enabling the present vehicle to move further forward, the preceding vehicle on the present lane can be avoided. It is noted that the present vehicle may preferably enter the forward avoidance region with a predetermined traveling speed set in advance by the driver.

In the above-described disclosure, the control means may preferably be configured to prioritize a control in which the present vehicle runs at a position to maintain the safe inter-vehicle distance between the present vehicle and the preceding vehicle when a relative traveling speed between the present vehicle and the preceding vehicle running on the adjacent lane is larger than a predetermined relative traveling speed.

As a result, a collision between the preceding vehicle on the present lane and the present vehicle can reliably be avoided. Specifically, when the relative traveling speed between the preceding vehicle on the adjacent lane and the present vehicle is larger than the predetermined traveling speed, having the present vehicle brake rather than entering the avoidance region by changing the running direction, a collision between the present vehicle and the preceding vehicle rapidly decelerating can be reliably avoided. Further, causing discomfort to the passengers in the present vehicle when the avoidance operation is performed can be avoided.

In the above-described disclosure, the driving control apparatus is provided with traffic lane determining means for determining a type of a traffic lane on which the present vehicle is running. The control means may preferably be configured to perform either the avoidance standby operation or the inter-vehicle distance maintaining control based on a result of a determination by the traffic lane determining means.

Thus, depending on the type of traffic lanes, i.e., the slow lane or the passing lane, the avoidance standby operation or the inter-vehicle distance maintaining control can be alternated whereby the preceding vehicle can be avoided easily.

For example, when the present vehicle is running on the slow lane, if the present vehicle enters the avoidance region on the passing lane, it is likely to collide with other vehicle approaching from the behind. Hence, the driving control apparatus may preferably prioritize the inter-vehicle distance maintaining control. Also, when the present vehicle is running on the passing lane, the driving control apparatus may preferably alternate between the avoidance standby operation and the inter-vehicle distance maintaining control.

Moreover, in the above-described disclosure, the region determining means may preferably be configured to determine whether or not only a region being present in a traffic lane where an average traveling speed of running vehicles is slower than that of the present lane among adjacent lanes being adjacent to both sides of the present lane, is the avoidance region.

Thus, since the region determining means determines the avoidance region as being present in a traffic lane where the average traveling speed of vehicles is slower than that of the present lane, the preceding vehicle can readily be avoided. In other words, changing traffic lane to an adjacent lane having higher average travelling speed requires the present vehicle to accelerate in order to avoid a collision with other vehicle running on the adjacent lane (adjacent vehicle). Hence, in this case, it is hard to avoid the preceding vehicle. However, according to the above-describe disclosure, the traffic lane change is accomplished by decelerating the vehicle whereby the preceding vehicle can readily be avoided.

According to the driving control apparatus of the present disclosure, the following advantage can be obtained. That is, since the driving control apparatus performs the avoidance standby operation wherein the present vehicle runs at a position capable of entering the avoidance region, e.g. adjacent position laterally to the avoidance region when the preceding vehicle is detected in front of the present vehicle, the preceding vehicle can readily be avoided.

BRIEF DESCRIPTION OF THE DRAWINGS

In the accompanying drawings:

FIG. 8 is a flowchart showing a driving control process executed by the on-vehicle driving control apparatus as shown in FIG. 7.

DETAILED DESCRIPTION OF THE PREFERRED EMBODIMENTS

First Embodiment

With reference to FIGS. 1 to 4, hereinafter is described an on-vehicle driving control apparatus 1 according to the first embodiment of the present disclosure. The on-vehicle driving control apparatus 1 is mounted on a present vehicle and constitutes a part of a tracking control system used for a tracking drive operation in which a present vehicle is driven so as to track a preceding vehicle that exists (running) ahead of the present vehicle. For instance, the tracking drive operation is accomplished with an adaptive cruise control (hereinafter described as ACC) in which the traveling speed of the present vehicle and an inter-vehicle distance between the present vehicle and the preceding vehicle are adjusted.

Figure 1:
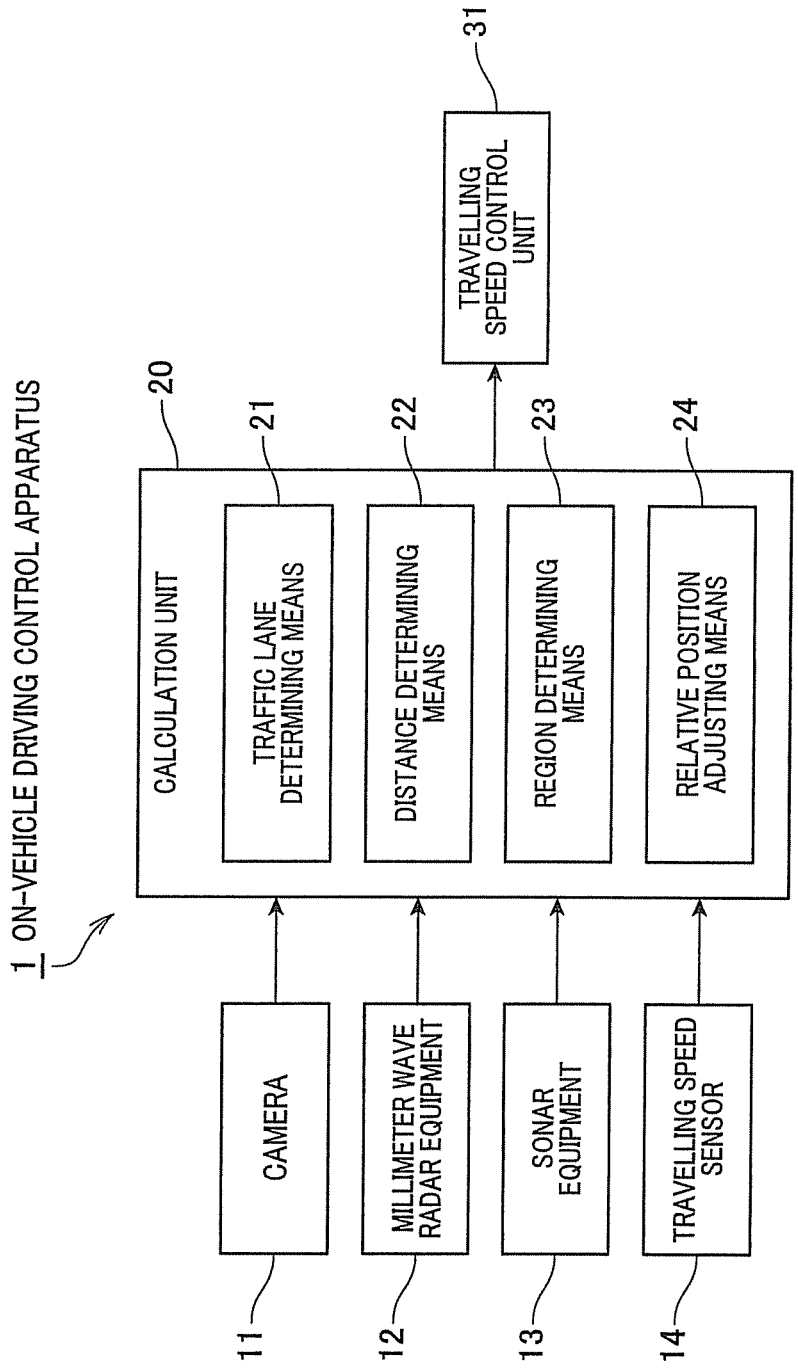
FIG. 1 is a block diagram showing an overall configuration of an on-vehicle driving control apparatus according to the first embodiment of the present disclosure.

As shown in FIG. 1, the on-vehicle driving control 1 (driving control apparatus) includes a camera 11 (traffic lane determining means) that detects a traffic lane, a millimeter wave radar equipment 12 (vehicle detecting means, region detecting means, distance determining means) used for detecting a safe inter-vehicle distance between the present vehicle and the preceding vehicle, and the forward avoidance region, a sonar equipment 13 (region detecting means) used for detecting the avoidance region, a traveling speed sensor 14 that detects the traveling speed of the present vehicle, a calculation unit 20 that determines the safe inter-vehicle distance, the forward avoidance region and the avoidance region, and a traveling speed control unit 31 (control means) that controls the traveling speed of the present vehicle.

Figure 2:
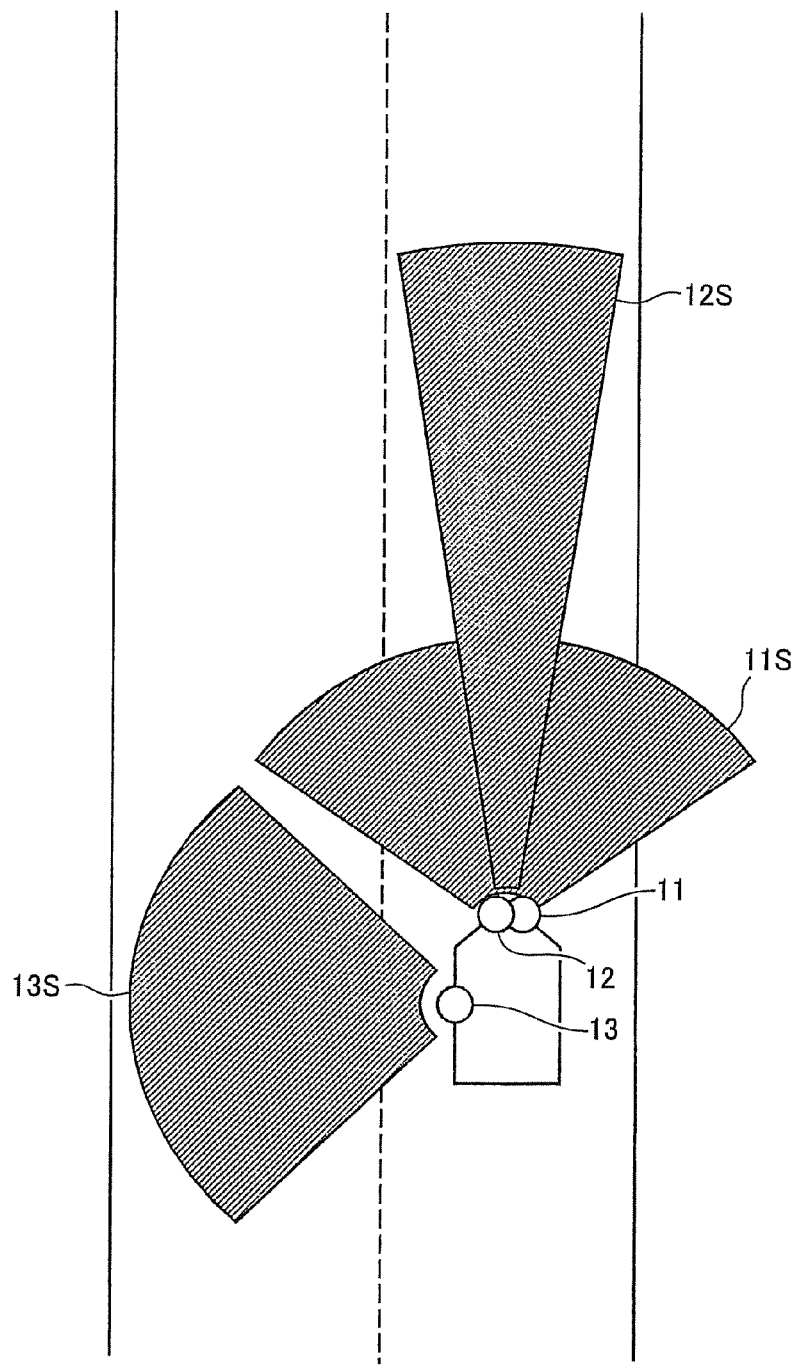
FIG. 2 is an explanatory diagram showing detection ranges of a camera, a millimeter wave radar equipment and a sonar equipment.
Figure 3:
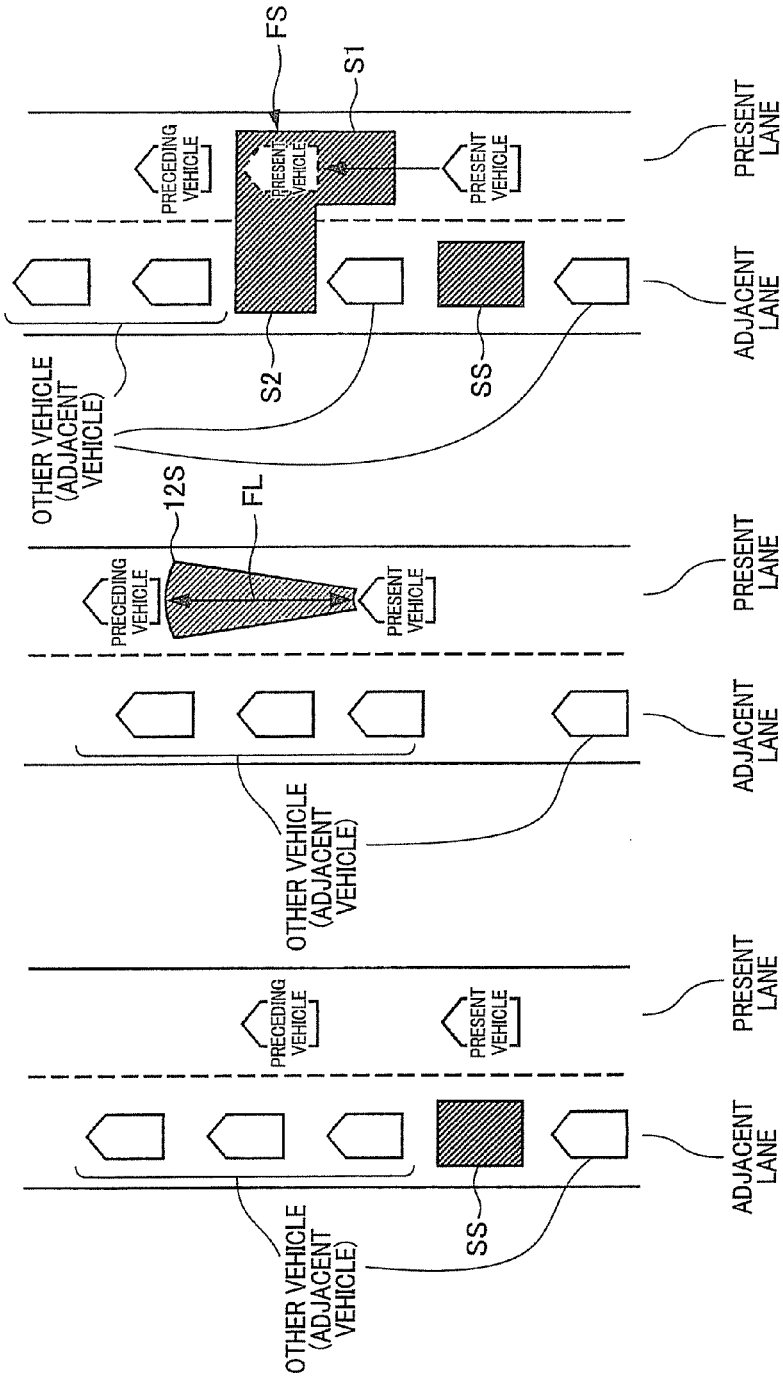
FIGS. 3A, 3B, 3C, are explanatory diagrams each showing an avoidance region, safe inter-vehicle distance and a forward avoidance region.

The camera 11 acquires at least an image for a traffic lane detecting area 11S as shown in FIG. 2 and outputs information about the acquired image to the calculation unit 20. It is noted that the image acquired by the camera 11 can be used for detecting the safe inter-vehicle distance to the preceding vehicle and for detecting the forward avoidance region other than detecting the traffic lane as described above. Moreover, the camera 11 may acquire the image of a region detection range 13S and the detected image can be used for detecting the avoidance region.

The millimeter radar equipment 12 detects a front obstacle such as a preceding vehicle being present in a front-distance-detection range 12S and measures a distance between the present vehicle and the front obstacle. The millimeter wave radar equipment 12 mixes transmitted waves (millimeter waves) that are emitted from a transmitter and received waves reflected from the preceding vehicle so as to extract a beat frequency in the mixed signal whereby information about a distance between the present vehicle and the preceding vehicle is acquired, and outputs the information about the distance to the calculation unit 20.

The sonar equipment 13 measures a distance between the present vehicle and an obstacle such as other vehicle being present in the region detection range 13S. The sonar equipment 13 measures a period from a time when the ultrasonic waves are emitted to a time when the reflected waves reflected at other vehicle arrive at the sonar equipment 13, so as to obtain distance information, and outputs the distance information to the calculation unit 20. Alternatively, the sonar equipment 13 may measure the distance between the present vehicle and the preceding vehicle in the front distance detection range 12S instead of the millimeter wave radar equipment 12.

The traveling speed sensor 14 detects a traveling speed of the present vehicle and outputs the traveling speed to the calculation unit 20. Regarding the camera 11, the millimeter radar equipment 12, the sonar equipment 13 and the traveling speed sensor 14, publicly-known products can be used and types and specifications thereof are not especially limited.

Regarding information used for detecting the traffic lane, measurement data by the laser radar equipment, positional information of the present vehicle acquired by the GPS (Global Positioning System) equipment, traffic lane information on the map and information acquired by the road-to-vehicle communication can be used to detect the traffic lane. Moreover, information acquired by the inter-vehicle communication performed between the present vehicle and other vehicle can be used for the information used for detecting the safe inter-vehicle distance to the preceding vehicle and forward avoidance region, or the information used for detecting the avoidance region.

The calculation unit 20 includes a traffic lane determining means 21, a distance determining means (safe distance determining means, inter-vehicle distance determining means) 22, a region determining means 23, and a relative position adjusting means (control means) 24.

The calculation unit 20 is a well-known microcomputer having CPU (central processing unit), ROM (read only memory), RAM (random access memory) and I/O (input and output) interface. The control program stored in a memory unit such as ROM enables the CPU to serve as the above-described traffic lane determining means 21, the distance determining means 22, the region determining means 23 and the relative position adjusting means 24.

The traffic lane determining means 21 is configured to analyze the image acquired by the camera 11 so as to determine a type of the traffic lane on which the present vehicle is running. It is noted that the types of traffic lane includes a slow lane or a passing lane.

The distance determining means 22 is configured to determine a safe inter-vehicle distance FL based on the distance information acquired by the millimeter wave radar equipment 12 and the traveling speed of the present vehicle acquired by the traveling speed sensor 14. As shown in FIG. 3A, the safe inter-vehicle distance FL is a distance between the present vehicle and the preceding vehicle, which is capable of preventing the present vehicle colliding with the preceding vehicle, by a braking operation of the present vehicle.

The region determining means 23 is configured to determine whether or not the avoidance region SS exists based on the distance information acquired by the sonar equipment 13. As shown in FIG. 3A, the avoidance region SS is a region (lateral region) on the slow lane (adjacent lane) adjacent to the traffic lane where the present vehicle exists (present lane), and being laterally to the present vehicle. The avoidance region SS has a sufficient area that allows the present vehicle to enter the avoidance region SS by changing the present lane to the adjacent lane.

The relative position adjusting means 24 is configured to perform an avoidance standby operation for having the present vehicle move to a position laterally to the avoidance region SS, i.e., a position where the present vehicle is capable of changing the traffic lane for entering the avoidance region SS, when the region determining means 23 determines that the avoidance region SS exists. In other word, the relative position adjusting means 24 is configured to adjust the relative position of the present vehicle with respect to the avoidance region SS such that the relative position adjusting means 24 outputs an adjustment signal to the traveling speed control unit 31 so as to change the traveling speed of the present vehicle in the tracking control determined by the driver in advance, thereby adjusting the relative position.

The traveling speed control unit 31 controls the traveling speed of the present vehicle based on the traveling speed at the tracking control operation set in advance by the driver and the adjustment signal outputted by the relative position adjusting means 24. For example, when the adjustment signal used to accelerate the present vehicle is received by the traveling speed control unit 31, a control signal that increases the output power of the engine is outputted to the engine mounted on the present vehicle. Meanwhile, when the adjustment signal used to decelerate the present vehicle is received by the traveling speed control unit 31, a control signal that reduces the output power of the engine mounted on the present vehicle is outputted or a control signal that commands the brake unit to generate brake force is outputted.

Figure 4:
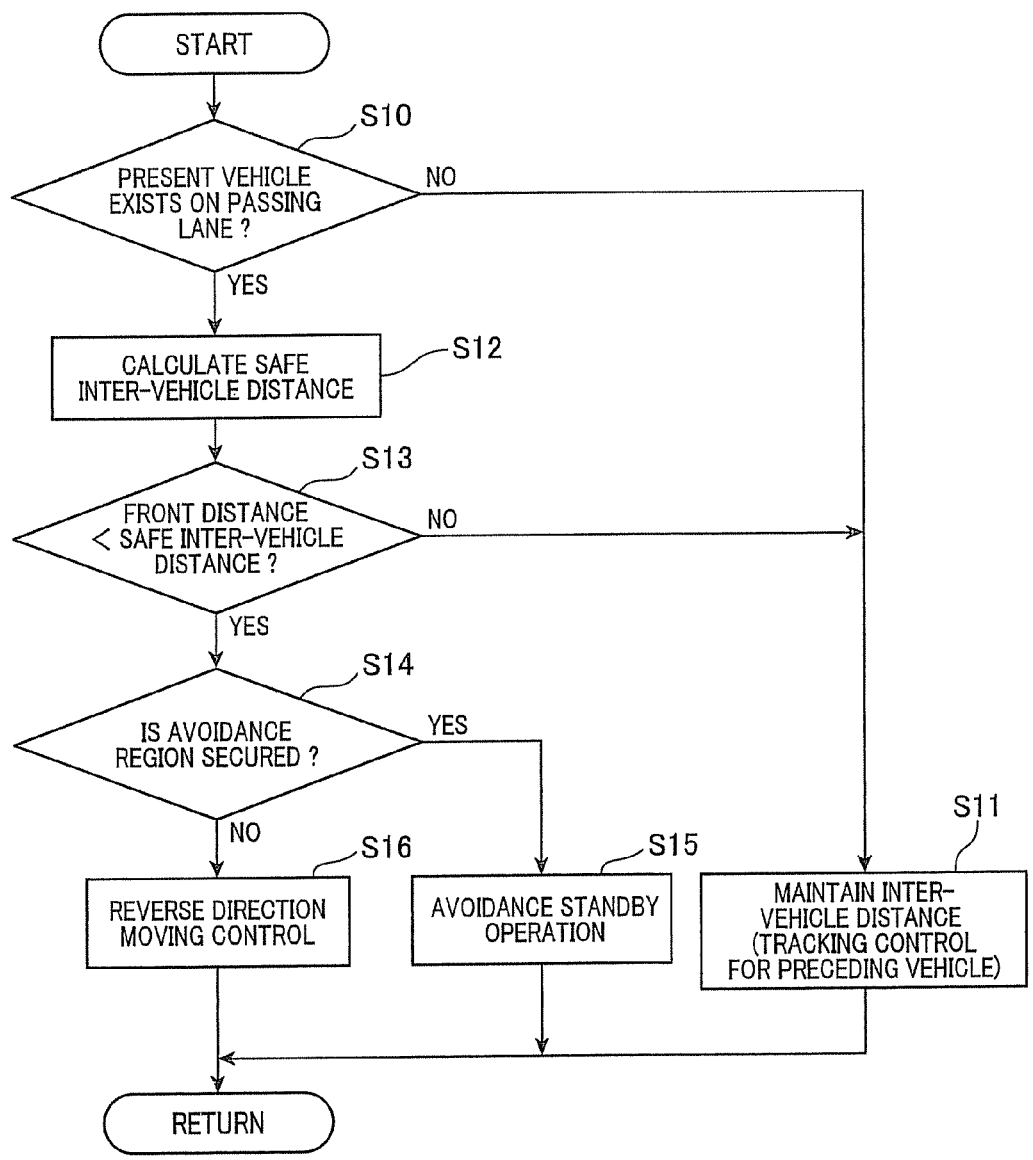
FIG. 4 is a flowchart showing a driving control process executed by the on-vehicle driving control apparatus as shown in FIG. 1.

Subsequently, with reference to a flow chart as shown in FIG. 4, a control of the on-vehicle driving control apparatus 1 configured as described above is now described as follows. In the following description, it is assumed that vehicles run in left-hand traffic such as in Japan or in the U.K. Therefore, when vehicles run in right-hand side traffic such as in the U.S., the opposite side of the road should be used in the following description.

When the tracking control for the preceding vehicle (i.e., the present vehicle tracks the preceding vehicle) is started, the calculation unit 20 allows the traffic lane determining means 21 to execute a determining process to decide whether or not the present lane is passing lane (S10). Specifically, by recognizing white lines or the like being present on both sides of the traffic lane where the present vehicle is running, based on the image of the traffic lane detecting area 11S as shown in FIG. 2, the traffic lane determining means 21 performs the determining process to determine whether or not the traffic lane is the passing lane.

In particular, when a white line with dotted line shape or a yellow line is recognized on the right side of the traffic lane and a white line with solid line shape is recognized on the left side of the traffic lane, the present lane is determined as a slow lane not the passing lane. Meanwhile, when a white line with dotted line shape or a yellow line is recognized on the left side of the traffic lane and a white line with solid line shape is recognized on the right side of the traffic lane, the traffic lane where the present vehicle is running is determined as a passing lane.

According to the above-described embodiment, an example in which a type of the present lane is determined by image processing of the traffic lane detecting area 11S acquired by the camera 11 is described. However, the type of the traffic lane can be determined by using a position of the present vehicle acquired by the GPS equipment and map information stored in advance. Moreover, the type of the traffic lane can be determined based on the information acquired by the road-to-vehicle communication.

At step S10, when it is determined that the present lane is not the passing lane (S10: No), the calculation unit 20 maintains the tracking control for the preceding vehicle (S11). In other word, the present vehicle tracks the preceding vehicle and the calculation unit 20 maintains a passing drive operation. When the tracking control is maintained, the calculation unit 20 returns to the above-described step S10 and executes the determining process again.

At step S10, when it is determined that the present lane is the passing lane (S10: YES), the calculation unit 20 allows the distance determining means 22 to execute a calculation processing that calculates a safe inter-vehicle distance FL which is a distance that prevents collision with the preceding vehicle by braking operation (S12). The safe inter-vehicle distance FL is calculated based on the traveling speed of the present vehicle acquired by the traveling speed sensor 104 and a brake performance data of the present vehicle which is stored in advance in the calculation unit 20.

The calculation unit 20 allows the distance determining means 22 to execute whether or not a front distance which is a distance between the present vehicle and the preceding vehicle is smaller than the safe inter-vehicle distance FL (S13). The above-described front distance can be calculated based on the distance information acquired by the millimeter wave radar equipment 12. When the distance determining means 22 determines that the front distance is larger than or equal to the safe inter-vehicle distance FL (S13: NO), the calculation unit 20 maintains the safe inter-vehicle, distance FL and continues to execute an inter-vehicle distance maintaining control for tracking the preceding vehicle (preceding vehicle tracking control) at step S11.

When it is determined that the front distance is less than the safe inter-vehicle distance FL (S13: YES), the calculation unit 20 allows the region determining means 23 to determine whether or not the avoidance region SS is secured (S14). In particular, the region determining means 23 calculates a region being present on the present lane and adjacent slow lane based on the distance information acquired by the sonar equipment 13 and determines whether or not the calculated region has sufficient area that allows the present vehicle to enter the region by changing the traffic lane, thereby determining whether or not the avoidance region SS is available.

When it is determined that the avoidance region is secured (S14: YES), the calculation unit 20 allows the relative position adjusting means 24 to perform an avoidance standby operation (S15) for having the present vehicle move to a position laterally to the avoidance region SS if the present vehicle is capable of changing the traffic lane for entering the avoidance region SS. Specifically, to maintain the relative position between the present vehicle and the avoidance region SS to be the above-described position where the present vehicle is capable of changing the traffic lane for entering the avoidance region SS, the relative position adjusting means 24 outputs an adjustment signal to the traveling speed control unit 31 so as to adjust the traveling speed of the present vehicle. Generally, since the moving speed of the avoidance region SS being present on the slow lane is slower than the traveling speed of the present vehicle running on the passing lane, the adjustment signal used to decelerate the traveling speed of the present vehicle to be the moving speed of the avoidance region SS is outputted. The traveling speed control unit 31 outputs a control signal to the engine of the present vehicle so as to control the traveling speed of the present vehicle to be a traveling speed based on the adjustment signal.

When it is determined that the avoidance region SS is not secured (S14: NO), the calculation unit 20 allows the relative position adjusting means 24 to perform a reverse direction moving control that moves the relative position of the present vehicle with respect to the preceding vehicle to the reverse direction (S16). In other word, the calculation unit 20 outputs the adjustment signal used to decelerate the traveling speed of the present vehicle to the traveling speed control unit 31 so as to have the front distance to be larger than the safe inter-vehicle distance FL. Then, the process returns to the step S10 and executes the above-described process again.

According to the on-vehicle driving control apparatus 1 of the above-described configuration, when the preceding vehicle running on a traffic lane where the present vehicle is running is detected, the avoidance standby operation is performed to have the present vehicle run at a location that enables the present vehicle to enter the avoidance region SS, for example, the avoidance standby operation is performed to have the present vehicle run at a location adjacent to the avoidance region SS. Therefore, even when the preceding vehicle rapidly decelerates, the present vehicle changes the running direction (changes the present lane) so as to enter the avoidance region SS whereby a collision with the present vehicle can be readily avoided.

When the safe inter-vehicle distance FL between the preceding vehicle running on the present lane and the present vehicle is secured, the safe inter-vehicle distance FL is maintained and the present vehicle tracks the preceding vehicle, and on-vehicle driving control apparatus prioritizes maintaining the passing drive control whereby the passing drive can be maintained without large variation of the traveling speed when the present vehicle is running on the passing lane.

When the safe inter-vehicle distance FL is not secured and the avoidance region SS exists, the avoidance standby operation is performed in order to avoid the preceding vehicle when it is necessary. In this case, even when the present vehicle is running on the passing lane, the present vehicle can be decelerated. Moreover, when the safe inter-vehicle distance FL is not secured and the avoidance region SS does not exist, the present vehicles is decelerated and moved further towards behind so as to perform the inter-vehicle distance maintaining control to expand the inter-vehicle distance between the present vehicle and the preceding vehicle to be the safe inter-vehicle distance FL.

When the present vehicle is running on the slow lane, since the on-vehicle driving control apparatus prioritizes the inter-vehicle distance maintaining control that maintains the safe inter-vehicle distance FL, other vehicle entering to the avoidance region SS from the passing lane is avoided so that a collision with the other vehicle approaching from behind can be prevented. When the present lane is the passing lane, either the avoidance standby operation or the inter-vehicle distance maintaining control can be appropriately selected based on the surrounding of the present vehicle. As a result, the passing drive operation can be made safely.

The relative position adjusting means 24 may prioritize the inter-vehicle distance maintaining control in which the present vehicle runs maintaining the safe inter-vehicle distance FL, when the relative traveling speed between the present vehicle and other vehicle running on the adjacent lane (i.e., adjacent vehicle) is larger than the predetermined relative traveling speed, e.g. a speed range from 20 km/hour to 30 km/hour.

In this way, when the relative traveling speed between the present vehicle and other vehicle running on the adjacent lane is larger than the predetermined relative traveling speed, by braking the present vehicle rather than having the present vehicle change the running direction to enter the avoidance region SS (i.e., avoidance operation), the present vehicle can reliably avoid colliding with a preceding vehicle that rapidly decelerates, and making the passengers in the present vehicle feel uncomfortable when the avoidance operation is performed can also be avoided.

Further, the region determining means 23 may determine whether or not only the region being present in a traffic lane where the average traveling speed of the vehicles is slower than that of the present lane among traffic lanes being adjacent to the both side of the present lane, is the avoidance region SS. It is noted that the traffic lane having slower average traveling speed of the vehicles may be determined by using a sensor such as image sensor or a predetermined traffic lane can be determined, e.g. left side traffic lane is determined to be the predetermined traffic lane when the vehicle is produced for left-hand traffic such as in Japan.

Thus, only the region being present on the adjacent traffic lane where vehicles run with average traveling speed slower than that of the present lane is used as the avoidance region SS whereby colliding with the preceding vehicle is avoided easily. In other word, changing the present lane to a traffic lane where vehicles run with faster average traveling speed requires acceleration of the vehicle to change the traffic lane so that it is difficult to avoid colliding with the preceding vehicle. However, when the present vehicle changes the present lane to a traffic lane where vehicles run with slower traveling speed, the present vehicle can change the present lane to the avoidance region SS on the adjacent traffic lane by decreasing the traveling speed, whereby the present vehicle can avoid colliding with the preceding vehicle easily.

Second Embodiment

Next, with reference to FIGS. 5 and 6, the second embodiment of the present disclosure is described as follows.

The configuration of the on-vehicle driving control apparatus according to the second embodiment is identical to the configuration of the first embodiment. However, in the second embodiment, adjusting the relative position of the present vehicle is further applied compared to the configuration of the first embodiment. Therefore, in the second embodiment, with reference to FIGS. 5 and 6, a controlling of the relative position to be adjusted is mainly described and explanations of other configurations are omitted.

Figure 5:
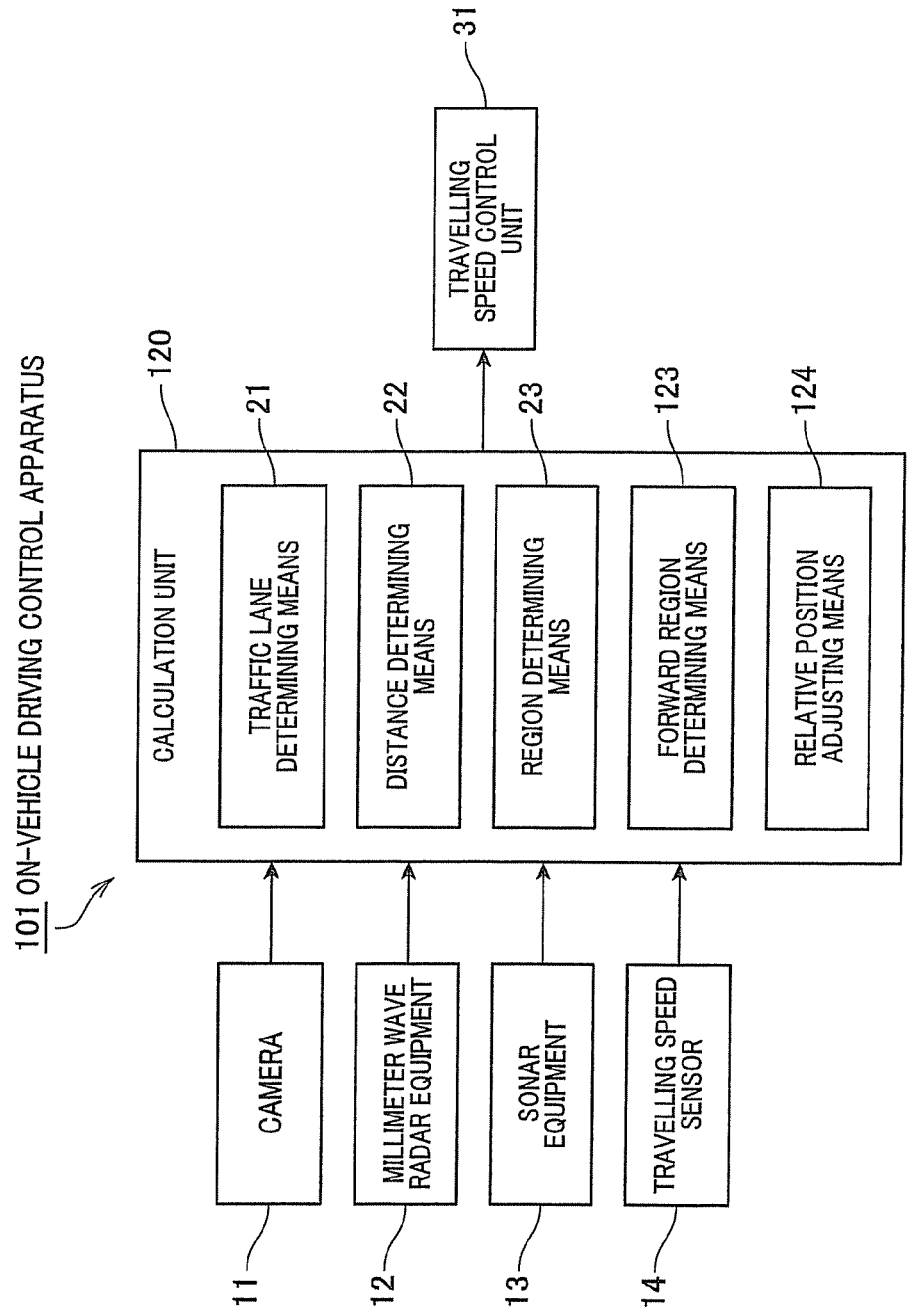
FIG. 5 is a block diagram showing an overall configuration of an on-vehicle driving control apparatus according to the second embodiment.

As shown in FIG. 5, the on-vehicle driving control apparatus 101 includes a camera 11 used for detecting traffic lane, a millimeter wave radar equipment 12 used for detecting the safe inter-vehicle distance between the present vehicle and the preceding vehicle, and the forward avoidance region, a sonar equipment 13 used for detecting the avoidance region, a traveling speed sensor 14 that detects the traveling speed of the present vehicle, a calculation unit 120 that determines the safe inter-vehicle distance, the forward avoidance region and the avoidance region, and a traveling speed control unit 31 that controls the traveling speed of the present vehicle.

The calculation unit 120 is provided with the traffic lane determining means 21, the distance determining means 22, the region determining means 23, a forward region determining means 123, and the relative position adjusting means (control means) 124.

The calculation unit 120 is a microcomputer including CPU (Central Processing Unit), ROM (Read Only Memory), RAM (Random Access Memory), I/O (Input and Output) and the like. A control program stored in the memory unit such as ROM allows the CPU to serve the above-described traffic lane determining means 21, the distance determining means 22, the region determining means 23, the forward region determining means 123 and the relative position adjusting means 124.

The forward region determining means 123 is configured to analyze the image acquired by the camera 11 thereby determining whether or not the forward avoidance region FS exists. As shown in FIG. 3C, the forward avoidance region FS is a region between the present vehicle and the preceding vehicle including a first region S1 and a second region S2. The first region S1 is a region on the present lane of which distance along the running direction is subtracted a necessary distance to avoid collision with the preceding vehicle by steering control from the distance between the present vehicle and the preceding vehicle. The second region S2 exists in front of the preceding vehicle on the adjacent slow lane and has a sufficient area that allows the present vehicle to enter the second region S2 by changing the traffic lane from the first region S1.

The forward region determining means may analyze the image information acquired by the camera 11 as described above so as to determine whether or not the forward avoidance region FS exist, or the forward region determining means may calculate the distance information acquired by the laser radar equipment and information acquired by the inter-vehicle communication so as to determine whether or not the forward avoidance region FS exist.

The relative position adjusting means 124 includes a control function other than the control function performed by the relative position adjusting means 124 according to the first embodiment. Specifically, when the forward region determining means 123 determines that the forward avoidance region FS exists, the relative position adjusting means 124 allows the present vehicle to enter the first region S1 and move to a region laterally to the second region S2. The detail explanation about the control function of the relative position adjusting means 124 is described later.

Figure 6:
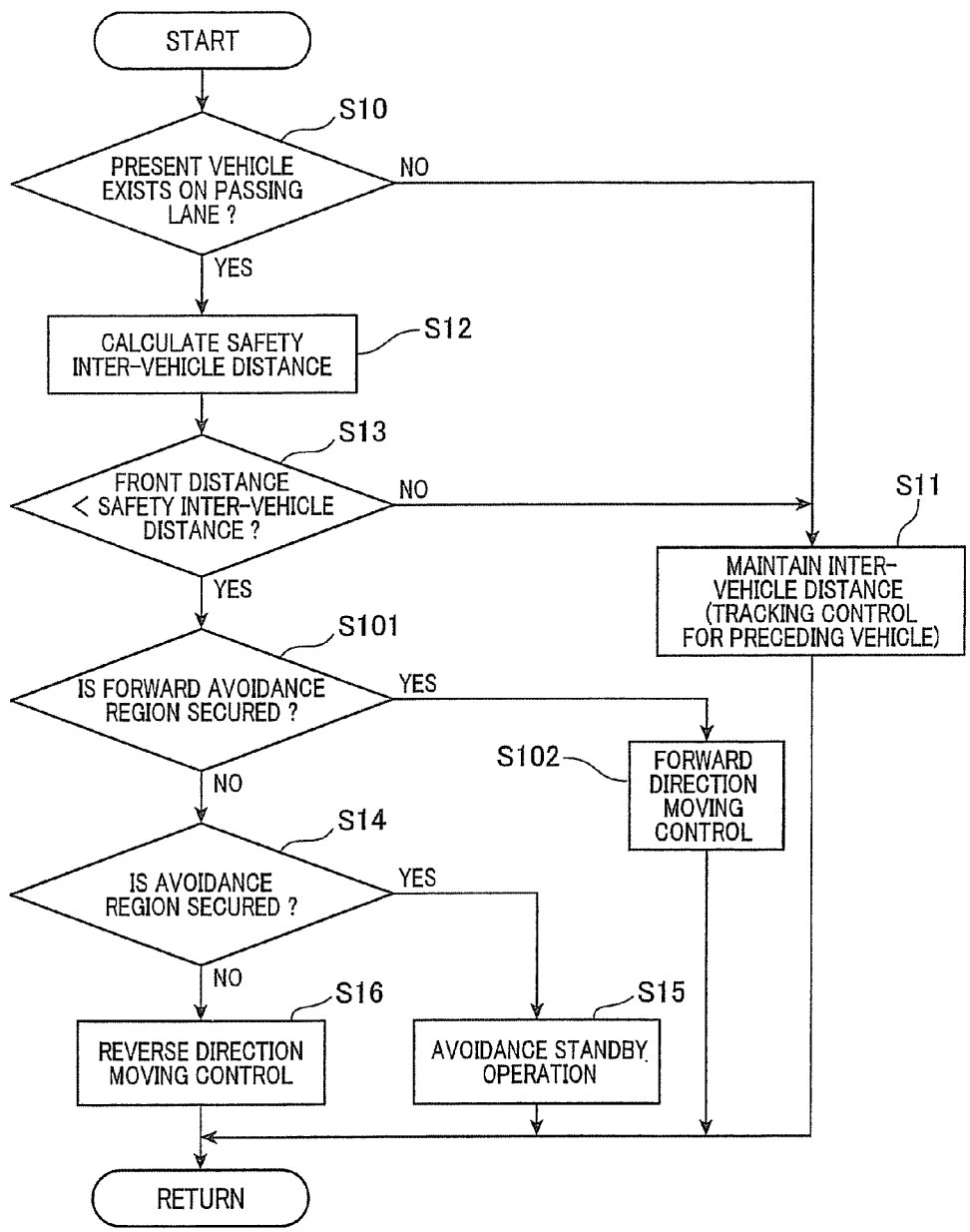
FIG. 6 is a flowchart showing a driving control process executed by the on-vehicle driving control apparatus as shown in FIG. 5.

Next, control function in the on-vehicle driving control apparatus 101 as described above is described with reference to the flowchart as shown in FIG. 6. Since the control processes, i.e., determining whether or not the front distance is smaller than the safe inter-vehicle distance FL (S13), after starting the tracking control in which the present vehicle tracks the preceding vehicle, are identical to that of the first embodiment, the explanation thereof is omitted.

At step S13, when the front distance is less than the safe inter-vehicle distance FL (S13: YES), the calculation unit 120 allows the forward region determining means 123 to determine whether or not the forward avoidance region FS is secured (S101). Specifically, the forward region determining means 123 acquires the regions being present on the present lane and the adjacent lane by a calculation based on the distance information acquired by the millimeter wave radar 12 and determines whether or not the acquired regions are the forward avoidance region FS including the first region S1 and the second region S2.

At the step S101, when the forward avoidance region FS is secured (S101: YES), the calculation unit 120 allows the relative position adjusting means 124 to perform a forward direction moving control so as to allow the present vehicle to enter the first region S1 and run at a position where the present vehicle is capable of moving to the second region from the first region (S102, FIG. 3C).

Specifically, the relative position adjusting means 124 outputs an adjustment signal to the traveling speed control unit 31 so as to adjust the traveling speed of the present vehicle whereby the present vehicle relatively moves to the forward direction and enters the first region S1. Then, when the present vehicle is moved to the region laterally to the second region S2, the relative position adjusting means 124 outputs an adjustment signal used to decelerate the traveling speed of the present vehicle to be the moving speed of the second region S2 to the traveling speed control unit 31. Then, the calculation unit 120 returns to step S10 as shown in FIG. 6 and executes the same processes again.

At step S101, when it is determined that the forward avoidance region FS is not secured (S101: NO), the calculation unit 120 allows the region determining means 23 to determine whether or not the avoidance region is secured (S14). Since subsequent processes are identical to the processes in the first embodiment, the explanation thereof is omitted.

According to the configuration as described above, the present vehicle runs at a region adjacent to the second region S2 in the forward avoidance region FS so that a collision between the present vehicle and the preceding vehicle can be avoided easily. That is, even when the avoidance region SS does not exist at a position laterally adjacent to the present vehicle, if the preceding vehicle on the present lane exists in front of the second region S2 of the forward avoidance region FS, by having the present vehicle further move to the forward direction, the preceding vehicle can be avoided. When the present vehicle enters the second region S2 of the forward avoidance region FS, it is preferable to enter the second region S2 with a predetermined traveling speed set in advance by the driver.

Third Embodiment

Next, with reference to FIG. 7 and FIG. 8, the third embodiment of the present disclosure is described as follows. The overall configuration of the on-vehicle driving control apparatus according to the third embodiment is the same as the one of the second embodiment, however, the configuration of the third embodiment differs from the one of the second embodiment in the control method for adjusting the relative position of the present vehicle. Hence, according to the third embodiment, only the control method for adjusting the relative position of the present vehicle is described and the explanation for the other elements and the like are omitted.

Figure 7:
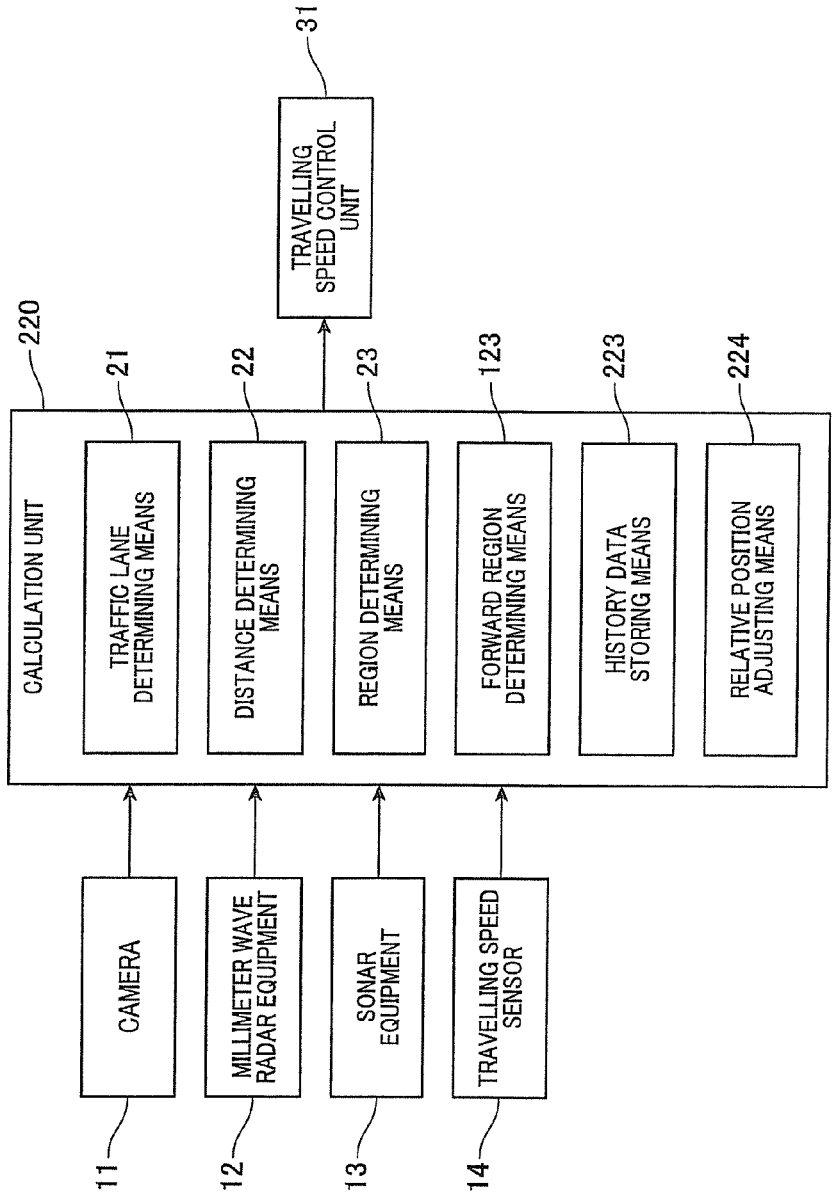
FIG. 7 is a block diagram showing an overall configuration of an on-vehicle driving control apparatus according to the third embodiment.

As shown in FIG. 7, the on-vehicle driving control apparatus 201 includes a camera 11 used for detecting the traffic lane, a millimeter wave radar equipment 12 used for detecting the forward safe inter-vehicle distance and the forward avoidance region, a sonar equipment 13 used for detecting the avoidance region, a traveling speed sensor 14 that measures the traveling speed of the present vehicle, a calculation unit 220 that determines the safe inter-vehicle distance, the forward avoidance region and the avoidance region, and a traveling speed control unit 31 that controls the traveling speed of the present vehicle.

The calculation unit 220 includes a traffic lane determining means 21, a distance determining means 22, a region determining means 23, a forward region determining means 123, a history data storing means 223, and a relative position adjusting means (acceleration/deceleration control means) 224.

The calculation unit 220 is a microcomputer having CPU, ROM, RAM and Input/Output interface. The control program stored in a memory unit such as ROM enables the CPU to serve as the above-described traffic lane determining means 21, the distance determining means 22, the region determining means 23, a forward region determining means 123, a history data storing means 223 and the relative position adjusting means 24.

The history data storing means 223 is configured to control the history data concerning the avoidance region SS which is determined by the region determining means 23 to be stored in the memory unit of the calculation unit 20 such as RAM and read the stored history data concerning the avoidance region SS.

The relative position adjusting means 224 executes control functions such as enabling the history data storing means 223 to store the history data about the avoidance region and reading the history data, other than the control function executed by the relative position adjusting means 124 of the second embodiment. The detail explanation about the control functions executed by the relative position adjusting means 224 is described later.

With reference to a flowchart as shown in FIG. 8, a control function executed in the on-vehicle driving control apparatus configured as described above is described as follows. Since the control processes from when the tracking control for the preceding vehicle starts to the determining process whether or not the avoidance region SS exists (S14) are the same as the one in the second embodiment, the explanation thereof is omitted.

When it is determined that the avoidance region SS is secured (S14: YES), the calculation unit 220 enables the history data storing means 223 to store the history data about the avoidance region SS (S201). The history data to be stored exemplifies a time when it is determined that the avoidance region SS is secured and a relative position of the avoidance region SS with respect to the present vehicle or the like.

When the history data of the avoidance region SS is stored to the memory unit, the calculation unit 220 allows the relative position adjusting means 224 to execute a relative position maintaining control (S15). Then process returns to the step S10 and repeatedly executes the above-described processes.

When it is determined that the avoidance region SS is not secured (S14: NO), the calculation unit 220 allows the history data storing means 223 to execute a reading process that reads the history data about the avoidance region SS stored in the memory unit (S202).

When the history data storing means 223 reads the history data about the avoidance region SS, the calculation unit 220 allows the relative position adjusting means 224 to execute a back and forth direction moving control that moves the relative position of the present vehicle with respect to the preceding vehicle a back or a forth direction (S203). Specifically, the calculation unit 220 searches the avoidance region SS being present within a range where the present vehicle is capable of moving, based on the history data of the avoidance region SS, and outputs an adjustment signal that changes the traveling speed of the present vehicle so as to allow the present vehicle to move to a lateral side of a avoidance region which is closest to the present vehicle among the avoidance regions searched by the calculation unit 220. For example, when the avoidance region SS exists, the calculation unit 220 outputs an adjustment signal that decelerates the traveling speed of the present vehicle to the traveling speed control unit 31. Then, the process returns to the step S10 and repeatedly executes the above-described process.

According to the above-described configuration, even when the forward avoidance region FS or the avoidance region SS is hard to secured, since the calculation unit 220 reads the history data concerning the avoidance region SS stored by the history data storing means 223, the present vehicle can be moved to the lateral side of the avoidance region SS being present apart from the present vehicle.

What is claimed is:

1. A driving control apparatus mounted on a present vehicle used for tracking drive operation wherein the present vehicle is driven so as to track a preceding vehicle existing ahead of the present vehicle, the driving control apparatus comprising:
    a control unit for controlling the present vehicle to accelerate or decelerate;
    a vehicle detecting unit for detecting the preceding vehicle;
    a region detecting unit for detecting a lateral region existing on an adjacent lane adjacent to a present lane where the present vehicle exists, the lateral region being laterally adjacent to the present vehicle; and
    a region determining unit for determining whether or not the lateral region is an avoidance region that has a predetermined area, wherein
    the control unit performs an avoidance standby operation that allows the present vehicle to accelerate or decelerate so as to maintain a relative position between the present vehicle and the avoidance region when the vehicle detecting unit detects the preceding vehicle existing on the present lane and when the region determining unit determines that the lateral region detected by the region detecting unit is the avoidance region, and the control unit controls the present vehicle to decelerate when the region determining unit determines no avoidance region is secured.

2. The driving control apparatus according to claim 1, further comprising:
    a distance determining unit for determining whether or not a distance between the present vehicle and the preceding vehicle existing on the present lane is a safe inter-vehicle distance that is capable of preventing the present vehicle from colliding with the preceding vehicle, by a braking operation of the present vehicle, wherein
    the control unit prioritizes an inter-vehicle distance maintaining control rather than the avoidance standby operation when the safe inter-vehicle distance is secured, the inter-vehicle distance maintaining control being performed such that acceleration or deceleration of the present vehicle is controlled so as to maintain the safe inter-vehicle distance;
    the control unit prioritizes the avoidance standby operation rather than the inter-vehicle distance maintaining control when the safe inter-vehicle distance is not secured and the avoidance region is determined by the region determining unit; and
    the control unit prioritizes the inter-vehicle distance maintaining control when the safe inter-vehicle distance is not secured and the avoidance region is not determined by the region determining unit.

3. The driving control apparatus according to claim 2, further comprising
    a traffic lane determining unit for determining a type of a traffic lane on which the present vehicle is running, wherein the control unit controls either the avoidance standby operation or the inter-vehicle distance maintaining control based on a result of determining by the traffic lane determining unit.

4. The driving control apparatus according to claim 1, further comprising forward region determining unit for determining whether or not a forward avoidance region having a predetermined area exists and the preceding vehicle running on the present lane exists ahead of the forward avoidance region, the forward avoidance region being located in front of a preceding vehicle on the adjacent lane that is ahead of the lateral region, wherein
    the control unit controls the present vehicle to move further forward direction on the present lane when the forward region determining unit determines the forward avoidance region exists and the preceding vehicle running on the present lane exists ahead of the forward avoidance region.

5. A driving control apparatus mounted on a present vehicle used for tracking drive operation wherein the present vehicle is driven so as to track a preceding vehicle existing ahead of the present vehicle, the driving control apparatus comprising:
    a control unit for controlling the present vehicle to accelerate or decelerate;
    a vehicle detecting unit for detecting the preceding vehicle;
    a region detecting unit for detecting a lateral region existing on an adjacent lane adjacent to a present lane where the present vehicle exists, the lateral region being laterally adjacent to the present vehicle; and
    a region determining unit for determining whether or not the lateral region is an avoidance region that has a predetermined area, wherein
    the control unit performs an avoidance standby operation that allows the present vehicle to accelerate or decelerate based on a result of determining by the region determining unit, when the vehicle detecting unit detects the preceding vehicle existing on the present lane,
    and the control unit prioritizes a control in which the present vehicle runs at a position to maintain a safe inter-vehicle distance that is capable of preventing the present vehicle colliding with the preceding vehicle when a relative traveling speed between the present vehicle and the preceding vehicle running on the adjacent lane is larger than a predetermined relative traveling speed.

6. A driving control apparatus mounted on a present vehicle used for tracking drive operation wherein the present vehicle is driven so as to track a preceding vehicle existing ahead of the present vehicle, the driving control apparatus comprising:
- a control unit for controlling the present vehicle to accelerate or decelerate;
- a vehicle detecting unit for detecting the preceding vehicle;
- a region detecting unit for detecting a lateral region existing on an adjacent lane adjacent to a present lane where the present vehicle exists, the lateral region being laterally adjacent to the present vehicle; and
- a region determining unit for determining whether or not the lateral region is an avoidance region that has a predetermined area, wherein
- the control unit performs an avoidance standby operation that allows the present vehicle to accelerate or decelerate based on a result of determining by the region determining unit, when the vehicle detecting unit detects the preceding vehicle existing on the present lane,
- and the region determining unit determines whether or not only a region present in a traffic lane where an average traveling speed of running vehicles is slower than that of the present lane among adjacent lanes being adjacent to both sides of the present lane, is the avoidance region.

7. A driving control apparatus mounted on a present vehicle used for tracking drive operation wherein the present vehicle is driven so as to track a preceding vehicle existing ahead of the present vehicle, the driving control apparatus comprising:
- a control unit for controlling the present vehicle to accelerate or decelerate;
- a vehicle detecting unit for detecting the preceding vehicle;
- a region detecting unit for detecting a lateral region existing on an adjacent lane adjacent to a present lane where the present vehicle exists, the lateral region being laterally adjacent to the present vehicle;
- a region determining unit for determining whether or not the lateral region is an avoidance region that has a predetermined area; and
- a history data storing unit for storing history data concerning the avoidance region;

wherein
- the control unit performs an avoidance standby operation that allows the present vehicle to accelerate or decelerate based on a result of determining by the region determining unit, when the vehicle detecting unit detects the preceding vehicle existing on the present lane,
- and the control unit searches the avoidance region being present within a range where the present vehicle is capable of moving, based on the history data of the avoidance region and controls a traveling speed of the present vehicle, when the region determining unit determines no avoidance region is secured.

* * * * *